US010235278B2

(12) United States Patent
Fenster

(10) Patent No.: US 10,235,278 B2
(45) Date of Patent: Mar. 19, 2019

(54) SOFTWARE TESTING USING STATISTICAL ERROR INJECTION

(71) Applicant: INTERNATIONAL BUSINESS MACHINES CORPORATION, Armonk, NY (US)

(72) Inventor: Yaacov Fenster, Petach Tikvah (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 698 days.

(21) Appl. No.: 13/788,965

(22) Filed: Mar. 7, 2013

(65) Prior Publication Data

US 2014/0258783 A1    Sep. 11, 2014

(51) Int. Cl.
G06F 11/00    (2006.01)
G06F 11/36    (2006.01)
G06F 11/34    (2006.01)

(52) U.S. Cl.
CPC ...... G06F 11/3688 (2013.01); *G06F 11/3457* (2013.01)

(58) Field of Classification Search
CPC .. G06F 11/261; G06F 11/3457; G06F 11/263; G06F 11/3688; G06F 9/4486; G01R 31/31816
See application file for complete search history.

(56) References Cited

U.S. PATENT DOCUMENTS

| 5,574,855 A | * | 11/1996 | Rosich | G06F 11/2221 714/41 |
| 5,654,841 A | * | 8/1997 | Hobson | G11B 5/59627 324/210 |
| 5,818,769 A | * | 10/1998 | Tweed | G11C 8/04 365/194 |
| 5,831,996 A | * | 11/1998 | Abramovici | G01R 31/31813 714/738 |

(Continued)

FOREIGN PATENT DOCUMENTS

| CN | 102103330 A | * | 6/2011 | ......... G03F 7/70625 |
| CN | 102629232 B | * | 3/2014 | |
| JP | 20100010793 A | | 1/2010 | |

OTHER PUBLICATIONS

Troeger, P., 2010 Third International Conference on Dependability: "Software-Implemented Fault Injection at Firmware Level".

(Continued)

*Primary Examiner* — Loan L. T. Truong
(74) *Attorney, Agent, or Firm* — Griffiths & Seaton PLLC

(57) ABSTRACT

Methods, apparatus and computer program products implement embodiments of the present invention that enable a device such as a disk drive, to receive a configuration message including an error in implementing an operation on the device and a statistical frequency of an occurrence of the error. Upon configuration, the device can receive multiple requests for the operation, and at the statistical frequency, respond to a given one of the requests with the error. In some embodiments the device may convey an error message (Continued)

indicating an occurrence of the error. Alternatively, the device may fail to complete the operation, delay in completing the operation or perform the operation incorrectly.

20 Claims, 3 Drawing Sheets

(56) References Cited

U.S. PATENT DOCUMENTS

| | | | | |
|---|---|---|---|---|
| 6,477,666 | B1* | 11/2002 | Sanchez | G06F 11/3688 714/38.12 |
| 6,865,500 | B1* | 3/2005 | Variyam | G01R 31/01 324/762.03 |
| 6,996,808 | B1* | 2/2006 | Niewiadomski | G06F 9/4486 717/130 |
| 7,124,327 | B2* | 10/2006 | Bennett | G06F 11/0712 714/38.13 |
| 7,404,107 | B2* | 7/2008 | Burk | G06F 11/263 714/41 |
| 7,536,605 | B2* | 5/2009 | Keaffaber | G06F 11/3688 714/25 |
| 7,751,449 | B2* | 7/2010 | Winters | H04L 41/145 370/229 |
| 7,782,791 | B2* | 8/2010 | Koo | H04L 1/0027 370/252 |
| 7,818,626 | B1* | 10/2010 | Tsien | G06F 11/366 714/25 |
| 7,827,445 | B2 | 11/2010 | Foster, Sr. et al. | |
| 7,900,093 | B2* | 3/2011 | Ertel | H04L 43/50 714/41 |
| 8,051,346 | B2* | 11/2011 | Somasundaram | G01R 31/31706 324/512 |
| 8,073,668 | B2* | 12/2011 | Kellington | G06F 11/261 703/14 |
| 8,140,317 | B2* | 3/2012 | Altrichter | G06F 11/3457 703/21 |
| 8,238,361 | B2* | 8/2012 | Carlsson | H04L 47/10 370/232 |
| 8,255,536 | B2* | 8/2012 | Chen | H04L 12/5695 709/223 |
| 8,296,739 | B2* | 10/2012 | Kalla | G06F 11/3668 717/124 |
| 8,448,027 | B2* | 5/2013 | Elnozahy | G06F 11/3672 714/25 |
| 8,645,766 | B2* | 2/2014 | Masser | G06F 11/3632 714/41 |
| 8,863,094 | B2* | 10/2014 | Song | G06F 11/3624 717/124 |
| 8,873,556 | B1* | 10/2014 | Zuk | H04L 45/306 370/389 |
| 8,917,628 | B2* | 12/2014 | Steiner | H04L 7/10 370/254 |
| 9,003,238 | B2* | 4/2015 | Floeder | 703/21 |
| 2003/0084384 | A1* | 5/2003 | White, III | H04L 1/08 714/704 |
| 2003/0212535 | A1* | 11/2003 | Goel | H04M 3/22 703/2 |
| 2003/0226061 | A1* | 12/2003 | Gender | G06F 11/3688 714/38.1 |
| 2004/0243882 | A1* | 12/2004 | Zhou | G06F 11/36 714/38.1 |
| 2005/0169186 | A1* | 8/2005 | Qiu | H04L 41/0631 370/242 |
| 2005/0273854 | A1* | 12/2005 | Chess | G06F 21/577 726/22 |
| 2005/0276200 | A1* | 12/2005 | Niwa | G11B 20/10222 369/59.19 |
| 2006/0104313 | A1* | 5/2006 | Haner | H04L 47/10 370/517 |
| 2006/0265201 | A1* | 11/2006 | Martin | G06Q 10/06 703/6 |
| 2006/0271825 | A1* | 11/2006 | Keaffaber | G06F 11/3688 714/38.13 |
| 2007/0019805 | A1* | 1/2007 | Karpovsky | H04L 9/0618 380/28 |
| 2007/0050686 | A1* | 3/2007 | Keeton | G06F 11/261 714/48 |
| 2007/0112715 | A1* | 5/2007 | Chen | G06F 11/0709 706/46 |
| 2007/0121764 | A1* | 5/2007 | Chen | H04L 27/2271 375/340 |
| 2007/0240154 | A1* | 10/2007 | Gerzymisch | G06F 8/61 717/174 |
| 2008/0059840 | A1* | 3/2008 | Takezawa | G05B 23/0248 714/37 |
| 2008/0215925 | A1* | 9/2008 | Degenaro | G06F 11/263 714/41 |
| 2008/0239942 | A1* | 10/2008 | Hsu | G06F 11/26 370/216 |
| 2009/0150732 | A1* | 6/2009 | Jung | G01R 31/318357 714/731 |
| 2009/0164846 | A1* | 6/2009 | Foster, Sr. | G11C 29/02 714/30 |
| 2009/0189666 | A1* | 7/2009 | Ichiyama | G01R 31/31709 327/261 |
| 2009/0189667 | A1* | 7/2009 | Ichiyama | G01R 31/31709 327/261 |
| 2009/0193296 | A1* | 7/2009 | Kellington | G01R 31/31816 714/33 |
| 2009/0281783 | A1* | 11/2009 | Bitar | G06F 11/3485 703/21 |
| 2009/0299611 | A1* | 12/2009 | Yamashita | F02D 41/2438 701/106 |
| 2009/0309567 | A1* | 12/2009 | Morroni | H02M 3/157 323/283 |
| 2009/0309666 | A1* | 12/2009 | Sun | H03L 7/099 331/44 |
| 2010/0010793 | A1* | 1/2010 | Herman | G08G 5/006 703/8 |
| 2010/0095156 | A1* | 4/2010 | Kan | G06F 9/30105 714/35 |
| 2010/0192051 | A1* | 7/2010 | Kabulepa | H04L 1/0061 714/807 |
| 2010/0287412 | A1 | 11/2010 | Cha et al. | |
| 2010/0287535 | A1* | 11/2010 | Kim | G06F 11/3688 717/127 |
| 2011/0055777 | A1* | 3/2011 | Tremaine | G06F 11/263 716/106 |
| 2011/0131424 | A1* | 6/2011 | Vigilant | G06F 7/723 713/189 |
| 2011/0161747 | A1* | 6/2011 | Yamazaki | G06F 11/2215 714/705 |
| 2011/0179311 | A1* | 7/2011 | Nachimuthu | G06F 11/3676 714/42 |
| 2011/0219287 | A1* | 9/2011 | Srinivas | H03M 13/07 714/781 |
| 2011/0252222 | A1* | 10/2011 | Van Nieuwenhuyze | G06F 21/52 712/220 |
| 2011/0289487 | A1* | 11/2011 | Song | G06F 11/3624 717/130 |
| 2012/0082253 | A1* | 4/2012 | Varadarajan | H04B 3/542 375/260 |
| 2012/0144244 | A1* | 6/2012 | Dan | G11C 29/10 714/39 |
| 2012/0166487 | A1* | 6/2012 | Stougie | G06F 11/1076 707/792 |
| 2012/0317069 | A1* | 12/2012 | Oono | G06F 11/3419 706/47 |
| 2013/0096902 | A1* | 4/2013 | Bose | G01R 31/31816 703/14 |
| 2013/0172079 | A1* | 7/2013 | Ivanov | H04L 69/40 463/31 |

(56) References Cited

U.S. PATENT DOCUMENTS

2014/0282332 A1* 9/2014 Katoch ............... G06F 17/5081
　　　　　　　　　　　　　　　　　　　　　　　716/112
2014/0325658 A1* 10/2014 Schweitzer ........... G06F 21/577
　　　　　　　　　　　　　　　　　　　　　　　726/25

OTHER PUBLICATIONS

Johansson, A., "Software Implemented Fault Injection Used for Software Evaluation".

* cited by examiner

SOFTWARE TESTING USING STATISTICAL ERROR INJECTION

FIELD OF THE INVENTION

The present invention relates generally to software testing, and specifically to testing software by simulating hardware errors at specific statistical frequencies.

BACKGROUND

Error injection (also known as fault injection) is a technique that tests software by introducing faults to test code paths, in particular error handling code paths that might otherwise rarely be followed. When testing software using error injection, errors can be introduced either during compilation or during runtime.

Compile-time injection is an injection technique where source code is modified to inject simulated faults into a system. One method of compile-time injection is called mutation testing which changes existing lines of code so that they contain faults. Runtime injection techniques use a deterministic software trigger to inject a fault into a software application that is currently executing.

The description above is presented as a general overview of related art in this field and should not be construed as an admission that any of the information it contains constitutes prior art against the present patent application.

SUMMARY

There is provided, in accordance with an embodiment of the present invention a method, including receiving, by a device, a configuration message including an error in implementing an operation on the device and a statistical frequency of an occurrence of the error, receiving multiple requests for the operation, and responding, at the statistical frequency, to a given one of the requests with the error.

There is also provided, in accordance with an embodiment of the present invention an apparatus, including a storage media configured to store data, and a processor configured to access the storage media, and to receive a configuration message including an error in implementing an operation on the storage device and a statistical frequency of an occurrence of the error, to receive multiple requests for the operation, and to respond, at the statistical frequency, to a given one of the requests with the error.

There is further provided, in accordance with an embodiment of the present invention a computer program product, the computer program product including a non-transitory computer readable storage medium having computer readable program code embodied therewith, the computer readable program code including computer readable program code configured to receive a configuration message including an error in implementing an operation on the device and a statistical frequency of an occurrence of the error, computer readable program code configured to receive multiple requests for the operation, and computer readable program code configured to respond, at the statistical frequency, to a given one of the requests with the error.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for testing software by monitoring the software's behavior while injecting simulated storage device errors at specific statistical frequencies. In some embodiments, one or more scenarios can be specified to simulate errors for specific operations (e.g., write requests) at specific statistical frequencies, and the scenarios can be conveyed to the storage device.

As explained in detail hereinbelow, upon receiving the scenarios, the storage device's firmware can be configured to inject (i.e., simulate) the specified errors at the specified statistical frequencies. Injecting errors at the specified statistical frequencies can enable software to be tested in scenarios that are more representative of problems encountered during the operational life of a storage device such as a hard disk. For example, scenarios can be defined that gradually increase errors, thus mimicking behavior of a hard disk that is starting to fail.

While the embodiments described herein relate generally to testing software applications executing in a facility comprising multiple clustered storage controllers, it will be understood that embodiments of the present invention may also be used for testing other types of software applications that execute on any type of computer system and interact with hardware such as storage devices and network adapters.

Figure 1:
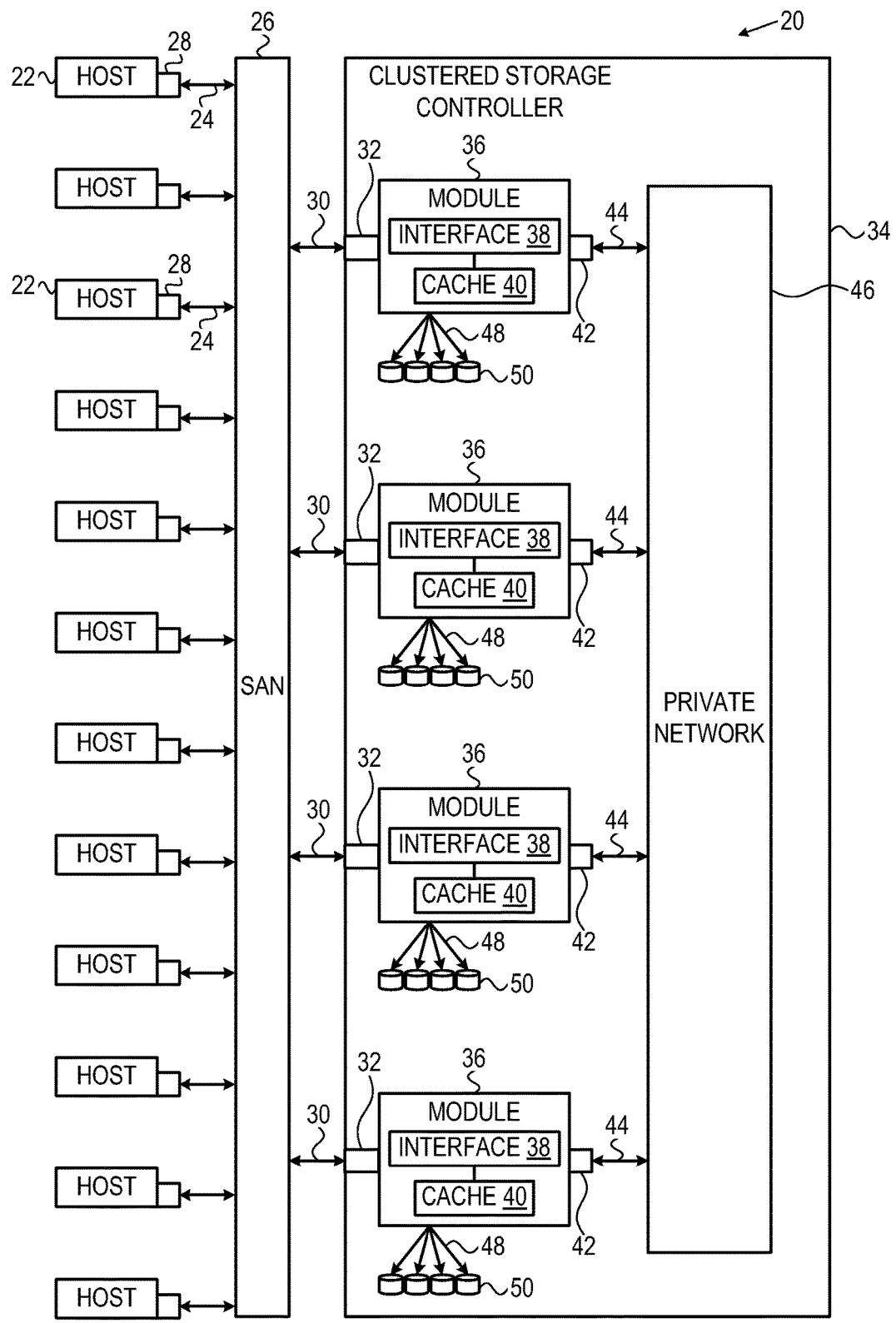
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Statistical Error Injection

Figure 2:
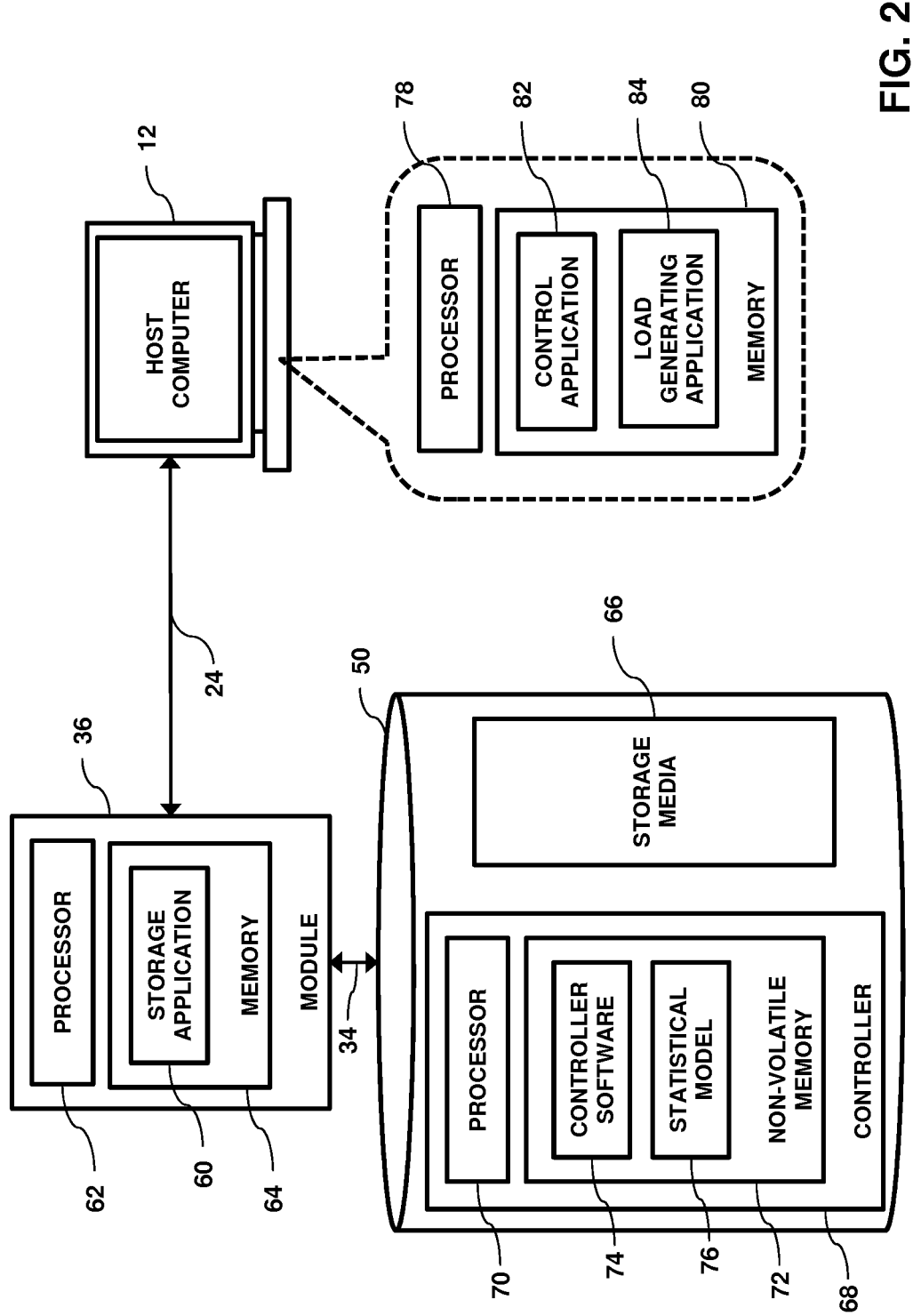
FIG. 2 is a block diagram of a module of the storage system configured to test software using statistical error injection, in accordance with an embodiment of the present invention.

FIG. 2 is a block diagram of a given module 36 executing a storage application 60 to be tested using statistical error injection, in accordance with an embodiment of the present invention. Module 36 comprises a processor 62 and a memory 64. Processor 62 executes storage application 60 from memory 64. In operation, storage application 60 processes storage requests from host computers 12, e.g., to store data to and retrieve data from storage devices 50.

Storage device 50 comprises storage media 66 and a controller 68. Storage media 66 comprises non-volatile devices and/or materials used to store data. Examples of storage media include platters for a hard disk drive and non-volatile random access memory (NVRAM) modules for a solid state drive (SSD).

Controller 68 comprises a processor 70 and a non-volatile memory 72. In operation, processor 70 executes controller software 74 that enables module 36 to access (i.e., read/write) data on storage media 66. In embodiments where storage device comprises a hard disk, processor 70 executes controller software 74 to control motors (not shown) on the storage device, and to command disk heads (not shown) to read or write data. Non-volatile memory 72 also comprises a statistical model 76, whose functionality is described hereinbelow. The combination of non-volatile memory and applications such as controller software 74 and statistical model 76 is also known as firmware.

Host computer 12 comprises a processor 78 and a memory 80. As described hereinbelow, processor 78 executes a control application 82 from memory 80. Control application 82 is configured to convey messages (also referred to herein as configuration messages) to configure statistical model 76. Upon configuring statistical model 76, processor 78 may execute a load generating application 84 from memory 80. In operation, load generating application 84 can issue large numbers of storage input/output requests (e.g., read or write requests) that can be used to place a heavy input/output (I/O) load on storage device 50 while testing storage application 60.

While the embodiments herein describe using load generating application 84 to place an I/O load on storage device 50, placing a load on other components of clustered storage controller 34 to test storage application 60 is considered to be within the spirit and scope of the present invention. For example, load generating application 84 may comprise a web load generating application that can place a heavy I/O load on adapters 32 and/or 42 while testing storage application 60.

Processors 62, 70 and 78 typically comprise general-purpose central processing units (CPU), which are programmed in software to carry out the functions described herein. The software may be downloaded to module 36, controller 68 and host computer 12 in electronic form, over a network, for example, or it may be provided on non-transitory tangible media, such as optical, magnetic or electronic memory media. Alternatively, some or all of the functions of processors 62, 70 and 78 may be carried out by dedicated or programmable digital hardware components, or using a combination of hardware and software elements.

Figure 3:
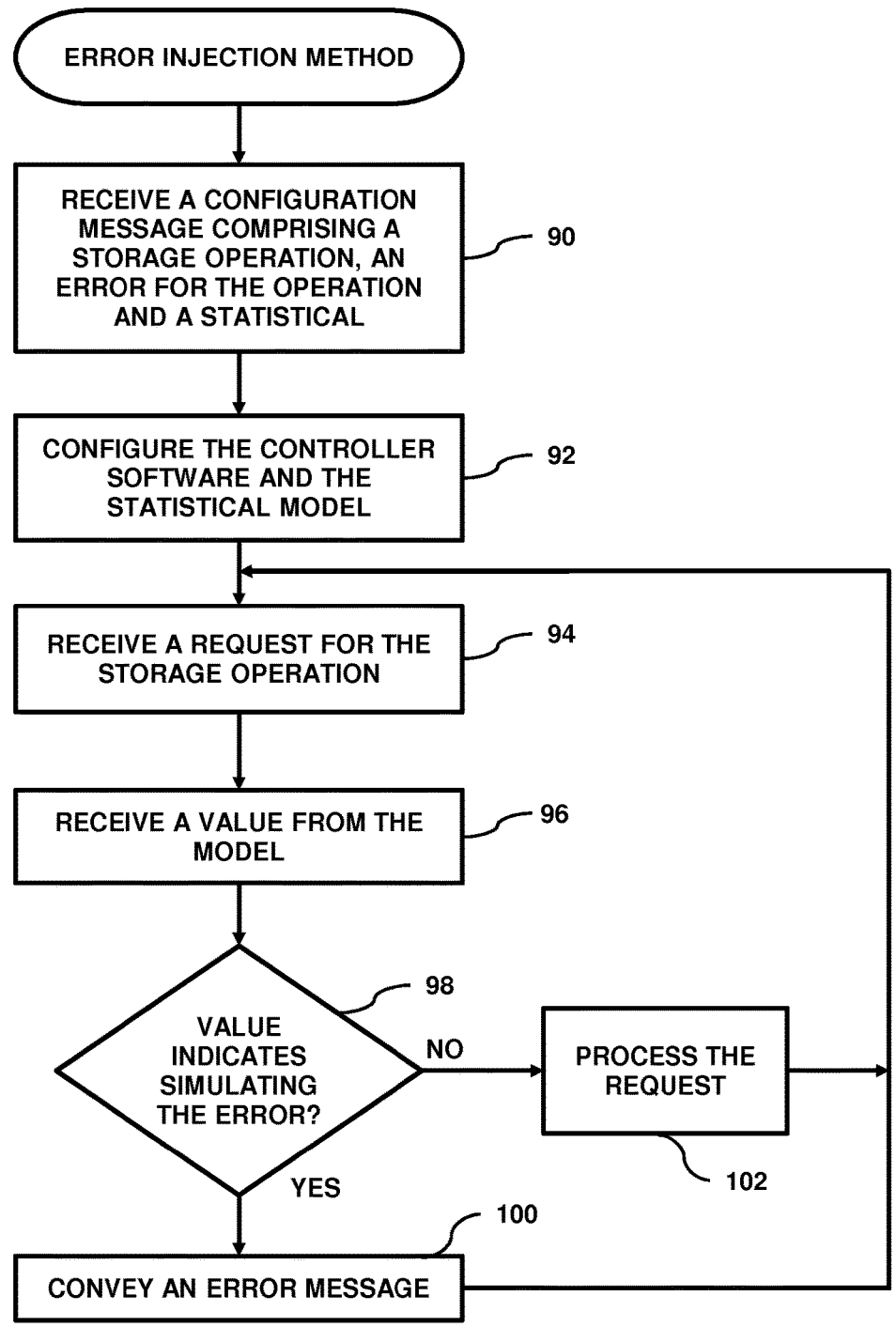
FIG. 3 is a flow diagram that schematically illustrates a method of software testing using statistical error injection, in accordance with an embodiment of the present invention.

FIG. 3 is a flow diagram that schematically illustrates a method of using statistical error injection to test storage application 60, in accordance with an embodiment of the present invention. In the embodiments described herein, a system administrator (not shown) enters, via control application 82, parameters for testing the storage application's response to errors experienced by storage device 50.

In a first receive step 90, processor 70 receives, from control application 82, a configuration message comprising parameters for errors in implementing operations on storage device 50. As described supra, the parameters may include a storage operation, a predefined range of blocks on the storage device, an error for the operation and a statistical frequency on an occurrence the error.

In some embodiments, the configuration message may comprise parameters defining multiple errors. The following example defines parameters to simulate a storage device (e.g., a disk) having certain failure rates for read and write operations, and having four "dirty" regions on the storage device:

All blocks on the storage device have a statistical probability of 0.0005% of failing to successfully complete a read operation, so that a statistical frequency for the failure of a read operation is set to be 0.0005%.

All blocks on the storage device have a statistical probability of 0.0005% of failing to successfully complete a write operation, so that a statistical frequency for the failure of a write operation is set to be 0.0005%.

Four ranges of contiguous blocks on the storage device have a statistical probability of 0.05% to delay completion of a read operation by two seconds, so that a statistical frequency for delaying the read operation is set to be 0.05%. The ranges of contiguous blocks may be defined by a starting logical block address and an ending logical block address on storage device 50.

In a configuration step 92, processor 70 configures controller software 74 and statistical model 76 based on the received parameters. In the example described supra, one of the parameters comprises a statistical probability of 0.0005% of failing to successfully complete a write operation. Therefore, processor 70 can configure controller software 74 to call statistical model 76 upon receiving a request for a write operation, and to convey a write error message upon receiving a specific value (e.g., "0") from the statistical model. Processor 70 can also configure statistical model 76 to return the specific value at a statistical frequency of 0.0005%.

In some embodiments, statistical model 76 may comprise a random number generator. For example, to instruct controller software 74 to return an error at a statistical frequency of 0.0005%, the random number generator can be configured to generate random whole numbers between 0-199,999, and the statistical model can be configured to return "0" upon the generated random number equaling "0", and to return "1" for all other generated random number values. In other words, statistical model 76 can be configured to generate the specific value (e.g., "0") at the statistical frequency specified in the configuration message.

Upon configuring controller software 74 and statistical model 76, processor 78 executes load generating application 84, in order to start stress-testing storage application 50 while storage device 50 receives a high volume of I/O requests. In some embodiments, processor 78 can configure load generating application 84 to generate requests for the specific operation to be tested. For example, processor 78 can configure load generating application 84 to issue a large volume of write requests to storage device 50, in order to test how storage application 50 operates when experiencing write failures.

In a second receive step 94, processor 70 receives a request for the operation to be tested. Upon receiving the request, processor 70 calls statistical model 76, and in a third receive step 96, receives a value from the statistical model (e.g., "0" or "1" as described supra). In a decision step 98, if the value indicates that processor 70 should simulate the error, then in an error step 100, processor 70 returns (i.e., conveys) an error message in response to the received request (i.e., for the operation to be tested), and the method continues with step 94. If the value does not indicate that processor 70 should simulate the error (or if the received request is not for the operation being tested), then in a processing step 102, controller software 74 processes the received request, and the method continues with step 94.

While receiving multiple requests for the operations to be tested (i.e., steps 94-102 in the flow diagram), the administrator can monitor load generating application 84 in order to verify the load placed on the storage device, and monitor storage application 60 in order to verify that the storage application properly identifies and handles the errors, in this case generated by the storage device's firmware.

In some embodiments, while testing storage application 60, the administrator can instruct host computer 12 to change the testing parameters. Changing parameters might include:

Configuring load generating application to increase or decrease the I/O load on the storage device.

Configuring statistical model 76 to increase or decrease the statistical probability for introducing a given error.

Configuring controller software 74 to delay, at the statistical frequency, responding to requests.

Configuring controller software 74 to modify data at the statistical frequency (i.e., to perform the requested operation incorrectly). For example, if the operation comprises a request to write specific data to the storage device, controller software 74 can be configured to modify (i.e., corrupt) the specific data prior to the write operation.

Configure controller software 74 to perform error recovery upon introducing an error.

In some embodiments, controller software 74 can be configured to return a specific error status when introducing an error. This embodiment is typically implemented in conjunction with the embodiment performing error recovery.

Configuring controller software 74 to ignore, at the statistical frequency, a given received request.

Configuring controller software 74 to report that a given operation has been completed successfully, but not perform the given operation (i.e., to perform the requested operation incorrectly). For example, when processing write requests from host computer 12, processor 70 can convey a write acknowledgement to the host computer without actually writing data to storage device 50.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a device, a configuration message comprising an error in implementing an operation on the device and a statistical frequency of an occurrence of the error, the statistical frequency being a statistical probability that a certain range of contiguous blocks of an input/output (I/O) operation will be delayed by a specified period of time;
receiving multiple requests for the operation;
responding, at the statistical frequency, to a given one of the requests with the error; wherein responding at the statistical frequency with the error comprises configuring a storage controller to incorrectly perform the operation by one of intentionally corrupting data associated with the operation prior to performing the operation, and report that the operation has been successfully completed without actually performing the operation; and
operating the configured storage controller to perform the operation incorrectly upon receiving, by the storage controller, the given one of the multiple requests for the operation, thereby performing fault-injection testing within the operation on the device using scenarios representative of actual operating conditions during a service life of the device.

2. The method according to claim 1, wherein the device comprises a storage device selected from a list comprising a hard disk drive and a solid state drive.

3. The method according to claim 2, wherein the operation is selected from a list comprising a read operation and a write operation.

4. The method according to claim 2, wherein the error occurs in a predefined range of blocks on the storage device.

5. The method according to claim 1, wherein the error is selected from a list comprising conveying an error message indicating the occurrence of the error, failing to complete the operation, delaying completion of the operation and incorrectly performing the operation.

6. The method according to claim 5 wherein responding at the statistical frequency comprises calling a statistical model upon receiving each of the requests, and conveying the error message upon the statistical model returning a specific value.

7. The method according to claim 6, wherein the statistical model comprises a random number generator configured to generate the specific value at the statistical frequency.

8. An apparatus, comprising:
a storage media configured to store data; and
a processor configured to access the storage media, and to receive a configuration message comprising an error in implementing an operation on the storage device and a statistical frequency of an occurrence of the error, the statistical frequency being a statistical probability that a certain range of contiguous blocks of an input/output (I/O) operation will be delayed by a specified period of time, to receive multiple requests for the operation, to respond, at the statistical frequency, to a given one of the requests with the error; wherein responding at the statistical frequency with the error comprises configuring a storage controller to incorrectly perform the operation by one of intentionally corrupting data associated with the operation prior to performing the operation, and report that the operation has been successfully completed without actually performing the operation, and to operate the configured storage controller to perform the operation incorrectly upon receiving, by the storage controller, the given one of the multiple requests for the operation, thereby performing fault-injection testing within the operation on the device using scenarios representative of actual operating conditions during a service life of the device.

9. The apparatus according to claim 8, wherein the apparatus comprises a storage device selected from a list comprising a hard disk drive and a solid state drive.

10. The apparatus according to claim 9, wherein the operation is selected from a list comprising a read operation and a write operation.

11. The apparatus according to claim 9, wherein the error occurs in a predefined range of blocks on the storage device.

12. The apparatus according to claim 8, wherein the processor is configured to select the error from a list comprising conveying an error message indicating the occurrence of the error, failing to complete the operation, delaying completion of the operation and incorrectly performing the operation.

13. The apparatus according to claim 12, wherein the memory is configured to store a statistical model, and wherein the processor is configured to respond at the statistical frequency by calling the statistical model upon receiving each of the requests, and conveying the error message upon the statistical model returning a specific value.

14. The apparatus according to claim 13, wherein the statistical model comprises a random number generator configured to generate the specific value at the statistical frequency.

15. A computer program product, the computer program product comprising:
a non-transitory computer readable storage medium having computer readable program code embodied therewith, the computer readable program code comprising:
computer readable program code configured to receive a configuration message comprising an error in implementing an operation on the device and a statistical frequency of an occurrence of the error, the statistical frequency being a statistical probability that a certain range of contiguous blocks of an input/output (I/O) operation will be delayed by a specified period of time;
computer readable program code configured to receive multiple requests for the operation;
computer readable program code configured to respond, at the statistical frequency, to a given one of the requests with the error; wherein responding at the statistical frequency with the error comprises configuring a storage controller to incorrectly perform the operation by one of intentionally corrupting data associated with the operation prior to performing the operation, and report that the operation has been successfully completed without actually performing the operation; and
computer readable program code configured to operate the configured storage controller to perform the operation incorrectly upon receiving, by the storage controller, the given one of the multiple requests for the operation, thereby performing fault-injection testing within the operation on the device using scenarios representative of actual operating conditions during a service life of the device.

16. The computer program product according to claim 15, wherein the device comprises a storage device selected from a list comprising a hard disk and a solid state drive, and wherein the operation is selected from a list comprising a read operation and a write operation.

17. The computer program product according to claim 16, wherein the error occurs in a predefined range of blocks on the storage device.

18. The computer program product according to claim 15, wherein the error is selected from a list comprising conveying an error message indicating the occurrence of the error, failing to complete the operation, delay completion of the operation and incorrectly performing the operation.

19. The computer program product according to claim 18, wherein computer readable program code is configured to respond at the statistical frequency by calling a statistical model upon receiving each of the requests, and conveying the error message upon the statistical model returning a specific value.

20. The computer program product according to claim 19, wherein the statistical model comprises a random number generator configured to generate the specific value at the statistical frequency.

* * * * *